US008380855B2

(12) United States Patent
Bryce et al.

(10) Patent No.: US 8,380,855 B2
(45) Date of Patent: Feb. 19, 2013

(54) HTTP HEADER INTERMEDIARY FOR ENABLING SESSION-BASED DYNAMIC SITE SEARCHES

(75) Inventors: Daniel John Bryce, Altadena, CA (US); Todd C. Williams, Thousand Oaks, CA (US)

(73) Assignee: Answer Financial, Inc., Encino, CA (US)

( * ) Notice: Subject to any disclaimer, the term of this patent is extended or adjusted under 35 U.S.C. 154(b) by 339 days.

(21) Appl. No.: 11/299,525

(22) Filed: Dec. 12, 2005

(65) Prior Publication Data

US 2007/0136477 A1 Jun. 14, 2007

(51) Int. Cl.
*G06F 15/16* (2006.01)
(52) U.S. Cl. .................... 709/227; 709/218; 709/228
(58) Field of Classification Search .................... 709/227
See application file for complete search history.

(56) References Cited

U.S. PATENT DOCUMENTS

| | | | |
|---|---|---|---|
| 5,875,296 A | 2/1999 | Shi et al. ................. 395/188.01 |
| 6,374,359 B1 | 4/2002 | Shrader et al. ................. 713/201 |
| 6,397,253 B1 | 5/2002 | Quinlan et al. ............... 709/227 |
| 6,401,125 B1 | 6/2002 | Makarios et al. ............. 702/229 |
| 6,473,802 B2 | 10/2002 | Masters ........................ 709/229 |
| 6,618,759 B1* | 9/2003 | Lefebvre et al. .............. 709/235 |
| 6,654,814 B1* | 11/2003 | Britton et al. ................. 709/246 |
| 6,701,350 B1 | 3/2004 | Mitchell ....................... 709/217 |
| 6,710,786 B1 | 3/2004 | Jacobs et al. ................. 345/153 |
| 6,732,269 B1 | 5/2004 | Baskey et al. ................. 713/153 |
| 6,851,060 B1 | 2/2005 | Shrader ......................... 713/201 |
| 6,910,180 B1 | 6/2005 | Cui et al. ...................... 715/513 |
| 7,296,076 B1* | 11/2007 | Portolani ...................... 709/227 |
| 2002/0032731 A1 | 3/2002 | Qian et al. .................... 709/204 |
| 2002/0038371 A1* | 3/2002 | Spacey ......................... 709/227 |
| 2002/0078136 A1 | 6/2002 | Brodsky et al. .............. 709/203 |
| 2002/0103823 A1 | 8/2002 | Jackson et al. ............. 707/501.1 |
| 2003/0018707 A1 | 1/2003 | Flocken ........................ 709/203 |
| 2003/0033367 A1 | 2/2003 | Itoh .............................. 709/203 |
| 2003/0037108 A1 | 2/2003 | Peiffer et al. ................. 709/203 |
| 2003/0061275 A1* | 3/2003 | Brown et al. ................. 709/203 |
| 2003/0158889 A1 | 8/2003 | Massarani et al. ........... 709/203 |
| 2003/0182357 A1 | 9/2003 | Chess et al. .................. 709/203 |
| 2004/0088349 A1 | 5/2004 | Beck et al. ................... 709/203 |
| 2005/0182826 A1* | 8/2005 | Knittel et al. ................ 709/219 |

* cited by examiner

*Primary Examiner* — Kenny Lin
*Assistant Examiner* — Shaq Taha
(74) *Attorney, Agent, or Firm* — Pillsbury Winthrop Shaw Pittman LLP

(57) ABSTRACT

In a computer network environment, a content-based session request issued by a search engine agent is modified to enable the search engine to index information from a server to maintain a state connection where the search engine agent cannot maintain session identification. The content-based session request is modified by a header intermediary module which then directs the request to target servers. The response from the web server is again modified by the header intermediary module prior to being sent to the client that issued the request. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

28 Claims, 2 Drawing Sheets

HTTP HEADER INTERMEDIARY FOR ENABLING SESSION-BASED DYNAMIC SITE SEARCHES

FIELD OF THE INVENTION

The present invention generally relates to facilitating information searches over a computer network. Specifically, the present invention relates to a method and system for modifying a content based session request issued by a search engine agent to allow access to and proper indexing of a dynamic hosted web site containing information sought by the search engine agent.

BACKGROUND OF THE INVENTION

HyperText Transfer Protocol (HTTP) is used by the World Wide Web to define how messages are formatted and transmitted, and to direct the actions of web servers and browsers in response to various commands. For example, when a user enters a Uniform Resource Locator (URL) into a browser, an HTTP command is sent to the web server directing it to fetch and transmit the requested web page.

HTTP uses a client-server model. An HTTP client, such as a web browser, opens a connection and sends a request message to an HTTP server, such as a web server within a source web site, which then returns a response message, usually containing the resource that was requested. Thus, in itself, HTTP is a "stateless" protocol, i.e., it does not provide for maintaining a "session" as a user requests and interacts with various resources. Each HTTP request for a web page is generally independent of other requests. After delivering the response, the web server closes the connection, and does not retain transaction information. Each client—server connection is fresh, containing no knowledge of any previous HTTP transaction.

Internet protocols and standards provide some support for "state" information, which is information that associates individual data packets with clients and with prior network activity, assigned priority information, service class levels, and the like. "State" refers to configuration, attributes, condition, or information content. The state of a system is usually temporary and volatile, as it changes with time and will be lost or reset to some initial state if the system is switched off. One standard supporting state information specifices a limited mechanism for the exchange of state information in which two HTTP headers called "set-cookie" and "cookie" indicate an HTTP packet that includes state information contained in the payload portion. Browser software that recognizes these headers is enabled to extract the state information and save it in a local data structure referred to as a "cookie." Depending on the site architecture, session ID information could be passed through the web server using various other data structures including the URL or form fields.

"Cookies" are the most common session managing method. Cookies can contain any information the server chooses to put in them and are used to maintain state between HTTP transactions, which are otherwise stateless. Cookies are information files for recording information sent from a web site to hardware such as a disk drive or the like in the client system. At the beginning of a session, the web site issues identification information, such as a session ID, to the client, and the browser at the client end records the identification information into a cookie. When the client accesses the web page that issued the cookie again, the information saved in the cookie is sent to the web site. This enables the web site at the server end to implement session management or customization to individual users by using the cookie information.

Another known technique for session management without using cookies implements session management by passing information as part of the URL. An example is a method for passing on session information as a parameter. A session ID is generated at the login, and this session ID is redirected to a first page as a parameter, and retained as the user moves from one page to another. The server receives the session ID passed as a parameter, and a server-side program dynamically creates a page including a hyperlink with the embedded session ID. Because the hyperlink in the page includes the session ID as a parameter, the session ID is passed on as the user moves to another link. In this manner, a unique session ID is held along a series of link-to-link movements, which makes it possible to manage users by referring to the session ID whenever necessary.

In another prior art method, when a browser sends a fresh request for a URL to a proxy server to access information on the web, the proxy server checks whether the browser is capable of handling cookies. The proxy server then finds the requested URL and removes any cookies introduced by the web site. The cookies are stored for future use. The proxy server then appends the browser's session ID to all of the links in the responsive URL, and sends the responsive page to the browser. This method therefore removes cookies and adds the session ID to the URL to maintain the state connection.

Mechanized search engines employ software agents (variously known as "robots", "crawlers," "spiders," "bots," "web wanderers," or "automated site searchers") to crawl (send HTTP requests) through web sites gathering URLs and other information such as the text of pages. The information gathered by the search engine agent is stored in the search engine's databases and indexed. Search engine "index servers" contain information similar to a book's index—a list of web pages that contain the words matching a particular user query.

Most search engine agents do not accept any cookies. Furthermore, adding the session ID to the URL introduces two problems for search engines. First, since the search engine index server would include the session ID as part of the page identification, it marks the same page as distinct for each session visit but not having unique content. Some search engine index servers may even tag the page as potential SPAM, since the content of each session page is (or is nearly) identical. Second, the indexed search would attempt to return each visitor to the site with the same session identification, causing the undesirable effect of commingling consumer data. Therefore there is a need for a method and system to overcome these shortcomings. In particular, it is highly desirable to do so without requiring extensive reprogramming of the web site's applications.

Web architects and designers have developed methods for maintaining "state" information for the duration of user interactions with server resources. The architecture of many web servers requires the ability to retain information between requests, when the systems become inactive. For dynamic web sites that customize a web page for individual users or contain a shopping cart function, it is especially critical to maintain state information about the user across multiple HTTP transactions.

SUMMARY OF THE INVENTION

In one embodiment of the present invention, a method of enabling a client to collect information from a server in a network environment is disclosed in which a content-based session request submitted by a client is received. A proxy session identification is injected into the content-based session request to enable access to a server. The proxy session identification is then removed from the server's response to the client. The proxy session identification is then stored for injection into the content-based session request in a subsequent content-based session request from the client.

In another embodiment of the present invention, a system for enabling a client to index information over a network is disclosed in which a proxy server capable of receiving a content-based session request communicated by a client. The content-based session request represents a first access request to at least one content server. A header intermediary module is stored on the proxy server. The header intermediary module is operable to inject a proxy session identification into the content-based session request to enable access to the at least one content server, and remove the proxy session identification from the at least one server's response to the first access request. The header intermediary module also stores the proxy session identification for injection into the content-based session request in a subsequent access request from the client.

In another embodiment of the present invention, a method of enabling session-based content searching over a network is disclosed. A content-based session request is received from a search engine agent. A proxy session identification is injected into the content-based session request. The content-based session request is transmitted to at least one content server controlling access to at least one network location that provides content sought by the search engine agent. A response is received from the at least one content server that includes the proxy session identification injected into the content-based session request. The proxy session identification is then removed from the response and stored for injection into a subsequent content-based session request issued by the search engine agent. The response is then transmitted to the search engine agent.

In yet another embodiment, an article of manufacture including a computer program carrier readable by a computer and embodying one or more instructions executable by the computer to enable session-based content searching over a network is disclosed. A proxy session identification is injected into a content-based session request received from a search engine agent. The article of manufacture processes transmission of the content-based session request to at least one content server controlling access to at least one network location that provides content sought by the search engine agent, and receipt of a response from the at least one content server that includes the proxy session identification injected into the content-based-session request. The proxy session identification is then removed from the response prior to communication to the search engine agent.

The foregoing and other aspects of the present invention will be apparent from the following detailed description of the embodiments, which makes reference to the several figures of the drawings as listed below.

DETAILED DESCRIPTION OF THE EMBODIMENTS

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

Figure 1:
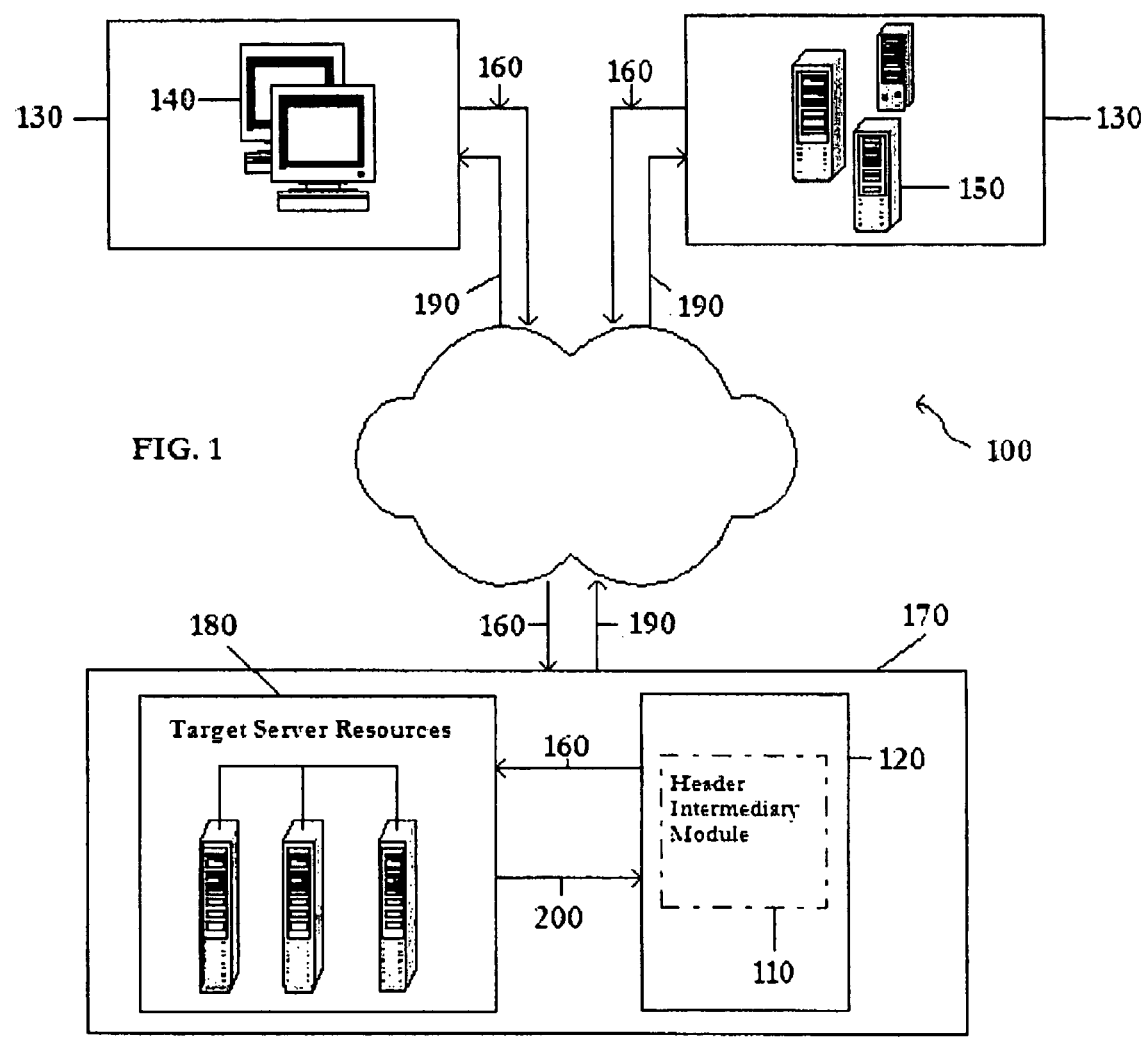
FIG. 1 is a diagram of client and server components and interaction with a header intermediary module in a network environment according to one embodiment of the present invention.

FIG. 1 is a flow diagram of a network environment 100 of the present invention in which a client 130 interacts with a server 170 through a network. In FIG. 1, the client 130 interacts with a header intermediary module 110 stored on a proxy server 120 in accordance with one aspect of the present invention. FIG. 1 depicts that the client 130 may be either a client browser 140 or a search engine agent 150. Site requests from the client browser 140 pass through the header intermediary module 110 on the proxy server 120 unchanged. However, requests for a content-based session search initiated by a client browser 140 or a search engine agent 150 are processed by the header intermediary module 110 relative to the steps shows in FIG. 2. In one embodiment, the search engine agent is initiated by a search engine attempting to access server-based web site information over the Internet.

Both the client browser 140 and the search engine agent 150 are capable of initiating content-based session request 160, which may also be referred to herein as requests 160. Each content-based session request 160 includes a header such as an HTTP header. When a content-based session request 160 is initiated by a client browser 140 or a search engine agent 150, the header intermediary module 110 identifies the source of the content-based session request 160 from one or more identifiers in the URL, from form fields, or from any of the other header fields such as the user-agent string.

Content-based session requests 160 initiated by search engine agents 150 typically do not include state information that enable requested web sites to maintain session integrity. Because of this, search engine agents 150 can have problems accessing sites that rely on session state information. Additionally, search engine agents 150 are incapable of receiving responses from requested web sites containing state information. The present invention addresses the issue of needing to maintain a state connection while ensuring that state information is not passed to the client 130 by examining HTTP request headers and inserting a proxy session ID in the data streams of content-based session requests 160 within the server environment 170.

For routine site traffic, the session ID maintains data specific to an individual client 130. Although many clients 130 can access an application simultaneously, the individual session IDs keep their own data separate. Each session ID can be used to track the progress of an individual client across multiple requests to the same application. All requests by one client use the same session ID, as long as those requests occur within the lifetime of that session ID.

The header intermediary module 110 creates a "session state" for the client 130, injecting a proxy session ID to enable the content-based session request 160 to access server resources. The injected proxy session ID may be passed as a session cookie, as part of the URL, as one or more HTTP form fields, or as any of the other HTTP header fields, such as the user-agent string. The header intermediary module 110 then ensures the injected proxy session ID is not returned to the client 130 by stripping away the proxy session ID before the server's response 190 to the content-based session request 160 reaches the client 130. The header intermediary module 110 then stores the proxy session ID for injection upon the next content-based session request 160 from that client browser 140 or search engine agent 150.

Figure 2:
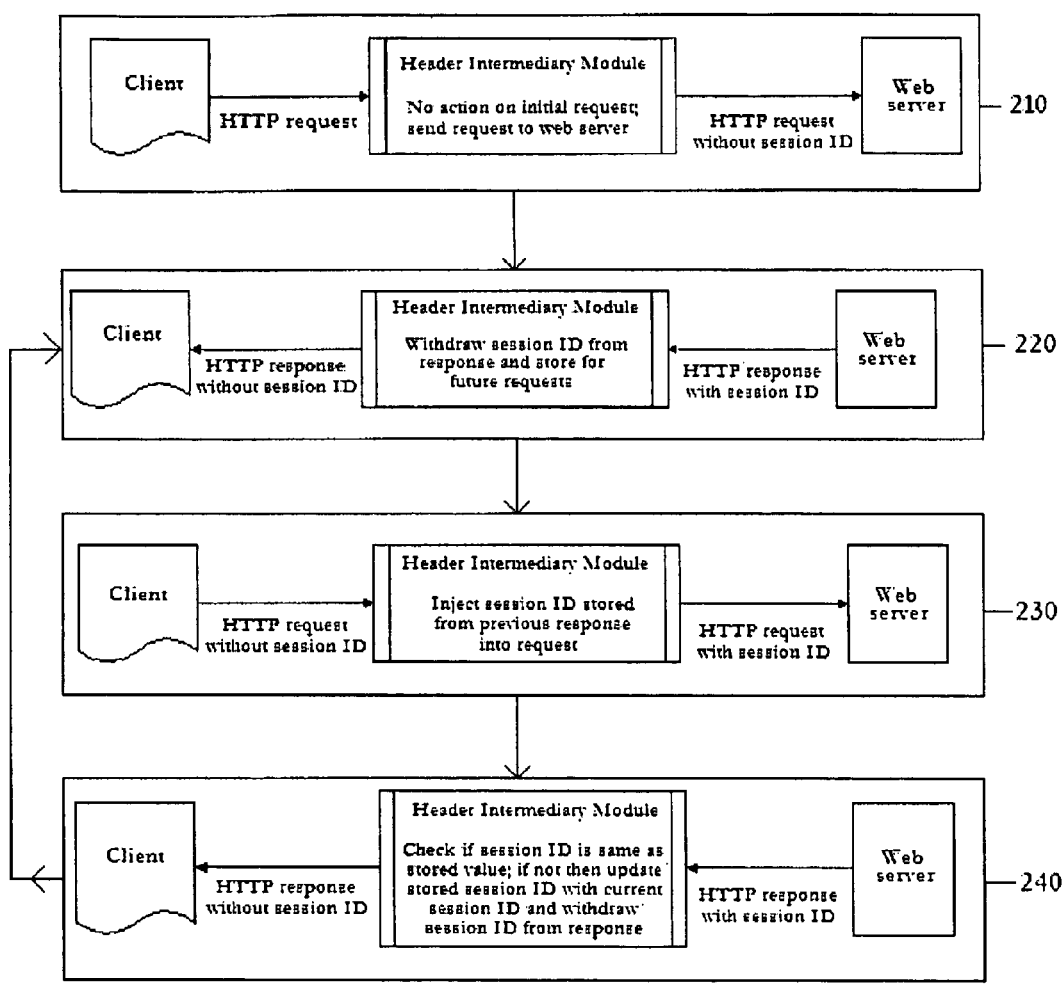
FIG. 2 is a flow chart showing steps performed by a header intermediary module according to one embodiment of the present invention.

FIG. 2 shows a flow diagram of details of processing a request according to one embodiment of the present invention. In accordance with FIG. 1, FIG. 2 depicts a first step 210, during which a search engine agent 150 issues a request 160 for a specific URL. The client 130 does not pass along any session ID as part of the HTTP header. The header intermediary module 110 looks in its database for valid session information. Upon startup, no such information exists, so the proxy server 120 passes on the request 160. A web server 180 accepts the request 160, detects that the requester does not currently have a session, initiates a session, performs any required one-time setup, and then processes the request 160.

In a second step 220, the web server 180 returns a response 190 including the session information. The header intermediary module 110 extracts the session information, stores it, strips it out of an HTTP response string 200, and returns the response 190 to the client 130. In subsequent client requests 160 such as in step 230, the header intermediary module 110 looks in its database for valid session identification information, injects it into the request 160, and forwards the content-based session request 160 on to the web server 180.

When the web server 180 returns its response 190, in step 240, the header intermediary module 110 examines the session information, compares it to the current session information, and updates the stored information if the new session information is different. The header intermediary module 110 then strips the session information out of the HTTP response string 200, and returns the response 190 to the client 130.

When the header intermediary module 110 receives an access request 160, it determines whether the content-based session search 160 originated from a search engine agent 150. If so, the header intermediary module 110 applies appropriate logic to inject the proxy session ID into the HTTP header. The header intermediary module 110 then identifies responses 190 and removes the proxy session ID from the data stream before the response 190 is returned to the client 130. The header intermediary module 110 then stores the proxy session ID in a database for future injection into the content-based session request 160 when the client 130 issues further content based session requests 160. If and when the search engine agent 150 sends additional content-based session requests 160, they too are identified and injected with the stored proxy session ID by the header intermediary module 110, repeating indefinitely.

The proxy session ID remains for the duration of a search engine agent's 150 session with the web server. Since the search engine agent 150 is visiting for very different purposes than most site traffic, the rationale for allowing the proxy session ID to expire does not necessarily apply. It may be preferable for proxy session IDs injected into search engine agents 150 to persist indefinitely, with no set expiration.

Further, since the search engine agent 150 does not interact conventionally with the server, but rather more passively collects data and links, in theory a single proxy session ID can be applied to all content-based session requests 160, regardless of specific origin. In practice, it may be preferable to apply a particular proxy session ID to all requests from a particular search engine agent 150.

Depending upon the server architecture, the session information may take any of several forms, including that of a cookie, an addition or modification to the URL, or HTTP form fields. In the present invention, however, these same mechanisms are used only within the server. For example, the server architecture of a dynamic web site may require the use of cookies. Generally, a cookie is introduced to the client 130 by including information with a Set-Cookie command in a header as part of an HTTP response string 200. The following is an example of the Set-Cookie command in one embodiment of the present invention that is included in an HTTP response string 200.

Upon detection of the SET-COOKIE code "SET-COOKIE: SessionID=ABC123DEF456" in the HTTP header the header intermediary module stores the Session ID (ABC123DEF456) and injects it into future HTTP requests by including the text "COOKIE: SessionID=ABC123DEF456" in the HTTP header.

The present method first recognizes the HTTP header in the content-based session request 160. Routine traffic is directed to a validation/authentication process, which may entail log in with name and/or password or, in simpler deployments, entry may be allowed if the client 130 is configured to accept cookies. However, for non-routine search engine agents 150, the header intermediary module 110 recognizes the particular characteristics of the search engine agent 150 and asserts a "proxy" cookie or proxy session ID in the first expression "SessionID". This proxy session ID, identified throughout the server resources or nodes, allows access to those resources.

In one embodiment, the HTTP response string 200 includes a second expression, which is an expiration date. The expiration date in the HTTP response string 200 may be set the same as routine traffic, for a longer duration, or with no expiration date at all.

In another embodiment of the present invention, the client object is parsed to determine a type of client. The client object includes a unique identifier comprised of the content-based session request 160 and at least one header. The unique identifier conveys information identifying the type of client 130. The client object is parsed by comparing the unique identifier to a list of unique identifiers stored in a table of known clients 130. The client object performs this comparison using pre-defined rules that determine the specific proxy session ID to inject into the client object for processing. Additionally, parsing the content-based session request 160 may also include blocking unwanted clients identified by the unique identifier. In yet another embodiment, the content-based session request 160 may be encoded such that authentication of the client according to its unique identifier includes decoding the content-based session request 160 prior to parsing.

While the computer system in the network environment 100 described is capable of executing the present invention described herein, this computer system is simply one example of a computer system. Those skilled in the art will appreciate that many other computer system designs are capable of performing the invention described herein within the network environment 100.

For example, the embodiment described above could describe any dynamic or e-commerce site that uses a single web server computer. Most such e-commerce sites employ a plurality of web server computers organized as a server computer farm or cluster. When an e-commerce site uses only a single web server computer, the single web server computer may easily track the session state of the accessing customer. However, most e-commerce sites employ a plurality of web server computers organized as a server computer farm.

With this architecture, any of the web server computers may service any particular client data request. Customer queries are typically distributed among the web servers by a load-balancing server computer. Thus, a web server that has responded to such a request may not service a client's subsequent request. And, each servicing web server may not possess a current copy of the client's session state. There are several common solutions such as broadcasting all current session IDs to all web server computers or writing all session states to a central file system that is accessible to all web server computers. However, because search engine agents 150 do not interact with the site in a conventional sense, in one embodiment of the invention, the header intermediary module 110 maintains a unique proxy session ID for each of the web servers where the same proxy session ID is shared by all the search engine agents 150.

Since a comprehensive series of content-based session searches 160 can require considerable bandwidth, in yet another embodiment of the invention, a load balancer (or context sensitive switch) could be used to send all content-based session requests 160 to a specific web server or servers. Furthermore, since injecting and stripping the proxy session ID will introduce additional latency, non-search engine agent content-based session requests 160 could be immediately forwarded by a load balancer to the standard web servers, thus bypassing the header intermediary module 110.

In another embodiment of the present invention, an application of a set of instructions in a code module may be resident in the random access memory of the computer system. Thus, the present invention may be implemented as a computer program product. In addition, although the various methods described are conveniently implemented in a server reconfigured by software, one of ordinary skill in the art would also recognize that such methods may be carried out in hardware, in firmware, or in a more specialized apparatus constructed to perform the required method steps.

Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

It is to be understood that other embodiments may be utilized and structural and functional changes may be made without departing from the scope of the present invention. The foregoing descriptions of embodiments of the invention have been presented for the purposes of illustration and description. It is not intended to be exhaustive or to limit the invention to the precise forms disclosed. Accordingly, many modifications and variations are possible in light of the above teachings. For example, the header intermediary module may be maintained on the proxy server 120 or remotely at a separate server coupled to the proxy server. Also, the proxy session ID may be injected into the client object in many different forms, including but not limited to appending the proxy session ID to a URL, as a cookie, or any other method of adding information to the data stream comprising the content-based session search 160 of the client 130. It is therefore intended that the scope of the invention be limited not by this detailed description.

The invention claimed is:

1. A method of enabling a client to collect information from a server in a network environment comprising:
    receiving a content-based session request submitted by a client;
    determining whether the client is a search engine and not a browser; injecting a proxy session identification into the content-based session request to enable access to a server, wherein the client does not include a session identification in the content-based session request and the session identification is needed to collect information from the server;
    removing the proxy session identification from the server's response to the client, wherein the proxy session identification is not needed to maintain a state connection between the client and the server after the server's response is provided to the client;
    storing the proxy session identification for injection into the content-based session request in a subsequent content-based session request from the client;
    parsing the content-based session request to determine a type of client, wherein the content-based session request includes a unique identifier comprised of the first access request and at least one header, the unique identifier conveying information identifying the type of client;
    wherein the parsing the content-based session request includes comparing the unique identifier to a stored table of unique identifiers and using pre-defined rules to direct the content-based session request for processing with infection of a specific proxy session identification.

2. The method of claim 1, wherein the injecting a proxy session identification into the content-based session request includes attaching a cookie to the content-based session request.

3. The method of claim 1, wherein the injecting a proxy session identification into the content-based session request includes attaching a URL to the content-based session request.

4. The method of claim 1, wherein the injecting a proxy session identification into the content-based session request includes attaching the proxy session identification in an HTTP form field in the content-based session request.

5. The method of claim 1, wherein the stored table of unique identifiers includes a lookup table of known clients.

6. The method of claim 5, wherein the parsing the content-based session request includes blocking unwanted clients identified by the unique identifier.

7. The method of claim 1, further comprising decoding the content-based session request to authenticate the client.

8. The method of claim 1, wherein the proxy session identification does not expire.

9. The method of claim 1, wherein the network is the Internet.

10. The method of claim 1, further comprising injecting a specific proxy session identification where the client is not enabled to handle cookies.

11. A system for enabling a client to index information over a network comprising:
    a proxy server capable of receiving a content-based session request communicated by a client, the content-based session request representing a first access request to at least one content server, wherein the client does not include a session identification in the content-based session request and the session identification is needed to index information from the at least one content server, and wherein the client is a search engine and not a web browser;

a header intermediary module stored on the proxy server, the header intermediary module operable to:

inject a proxy session identification into the content-based session request to enable access to the at least one content server, remove the proxy session identification from the at least one server's response to the first access request, wherein the proxy session identification is not needed to maintain a state connection between the client and the at least one content server after the at least one content server's response to the client, store the proxy session identification for injection into the content-based session request in a subsequent access request from the client;

wherein the proxy server determines a type of client, the content-based session request including a unique identifier comprised of the first access request and at least one header, the unique identifier conveying information identifying the type of client;

wherein the unique identifier is compared to a stored table of unique identifiers, the proxy server using pre-defined rules to direct the content-based session request for processing with injection of a specific proxy session identification.

12. The system of claim 11, wherein the proxy session identification is injected into the content-based session request as a cookie.

13. The system of claim 11, wherein the proxy session identification is injected into the content-based session request as a URL.

14. The system of claim 11, wherein the proxy session identification is injected into the content-based session request as an HTTP form field.

15. The system of claim 11, wherein the stored table of unique identifiers includes a lookup table of known clients.

16. The system of claim 15, wherein the proxy server blocks unwanted clients identified by the unique identifier.

17. The system of claim 11, wherein the proxy server decodes the content-based session request to authenticate the client.

18. The system of claim 11, wherein the proxy session identification does not expire.

19. The system of claim 11, wherein the network is the Internet.

20. The system of claim 11, wherein the proxy server injects a specific proxy session identification where the client is not enabled to handle cookies.

21. The system of claim 11, wherein the client issues a plurality of access requests for content from a plurality of content servers.

22. The system of claim 11, further comprising a load balancing device governing access to a particular server in the plurality of content servers, the load balancing device directing the plurality of access requests to particular content servers in the plurality of content servers.

23. A method of enabling session-based content searching over a network comprising:

receiving a content-based session request from a search engine agent, wherein the search engine agent is not a web browser;

injecting a proxy session identification into the content-based session request, wherein the search engine agent does not provide session identification information that is needed to complete the content-based session request;

transmitting the content-based session request to at least one content server controlling access to at least one network location that provides content sought by the search engine agent;

receiving a response from the at least one content server, wherein the response includes the proxy session identification injected into the content-based session request; removing the proxy session identification from the response;

storing the proxy session identification for injection into a subsequent content-based session request issued by the search engine agent;

transmitting the response to the search engine agent, wherein the proxy session identification is not needed to maintain a state connection between the at least one content server and the search engine agent after the at least one content server's response is transmitted to the search engine agent;

parsing the content-based session request to determine a type of search engine, wherein the content-based session request includes a unique identifier comprised of the first access request and at least one header, the unique identifier conveying information identifying the type of search engine; and comparing the unique identifier to a stored table of unique identifiers and using pre-defined rules to direct the content-based session request for processing with injection of a specific proxy session identification.

24. The method of claim 23, further comprising blocking unwanted clients identified by the unique identifier.

25. The method of claim 23, further comprising decoding the content-based session request to authenticate the client.

26. The method of claim 23, wherein the receiving a content-based session request from a search engine includes receiving a plurality of content-based session requests, the plurality of content-based session requests seeking content from a plurality of content servers.

27. The method of claim 26, further comprising directing the plurality of content-based session requests to particular content servers in the plurality of content servers, wherein the proxy server includes a load balancing device governing access to a particular server in the plurality of content servers.

28. An article of manufacture comprising a computer program stored on a non-transitory readable medium, readable by a computer and embodying one or more instructions executable by the computer to enable session-based content searching over a network, comprising:

injecting a proxy session identification into a content-based session request received from a search engine agent, wherein the search engine agent does not provide session identification information that is needed to complete the content-based session request, and wherein the search engine agent is not a browser;

processing transmission of the content-based session request to at least one content server controlling access to at least one network location that provides content sought by the search engine agent and receipt of a response from the at least one content server that includes the proxy session identification injected into the content-based session request;

removing the proxy session identification from the response prior to communication to the search engine agent, wherein the proxy session identification is not needed to maintain a state connection between the at least one content server and the search engine agent;

parsing the content-based session request to determine a type of client, wherein the content-based session request includes a unique identifier comprised of the first access request and at least one header, the unique identifier conveying information identifying the type of client;

wherein the parsing the content-based session request includes comparing the unique identifier to a stored table of unique identifiers and using pre-defined rules to direct the content-based session request for processing with infection of a specific proxy session identification.

* * * * *